US011135917B2

United States Patent
Triglia et al.

(10) Patent No.: US 11,135,917 B2
(45) Date of Patent: Oct. 5, 2021

(54) FORWARD COLLISION AVOIDANCE DISPLAY

(71) Applicants: DENSO International America, Inc., Southfield, MI (US); DENSO CORPORATION, Kariya (JP)

(72) Inventors: Nicholas Triglia, Warren, MI (US); Reben Werman, Sterling Heights, MI (US)

(73) Assignees: DENSO International America, Inc., Southfield, MI (US); DENSO CORPORATION, Kariya (JP)

( * ) Notice: Subject to any disclaimer, the term of this patent is extended or adjusted under 35 U.S.C. 154(b) by 235 days.

(21) Appl. No.: 16/371,752

(22) Filed: Apr. 1, 2019

(65) Prior Publication Data

US 2020/0070660 A1    Mar. 5, 2020

Related U.S. Application Data

(60) Provisional application No. 62/727,209, filed on Sep. 5, 2018.

(51) Int. Cl.
*B60K 35/00* (2006.01)
*G02B 27/01* (2006.01)
*B60W 50/14* (2020.01)

(52) U.S. Cl.
CPC .............. *B60K 35/00* (2013.01); *B60W 50/14* (2013.01); *G02B 27/01* (2013.01); *B60K 2370/152* (2019.05); *B60K 2370/179* (2019.05); *B60K 2370/331* (2019.05); *B60K 2370/334* (2019.05)

(58) Field of Classification Search
None
See application file for complete search history.

(56) References Cited

U.S. PATENT DOCUMENTS

| | | | |
|---|---|---|---|
| 2010/0067118 A1 | 3/2010 | Takahashi et al. | |
| 2017/0038587 A1* | 2/2017 | Ishibashi | H02P 8/24 |
| 2017/0193824 A1 | 7/2017 | Wu | |
| 2018/0157036 A1* | 6/2018 | Choi | G06T 19/006 |
| 2019/0129172 A1* | 5/2019 | Misawa | H05K 7/2039 |
| 2019/0285884 A1* | 9/2019 | Fujita | G02B 5/26 |
| 2020/0006443 A1* | 1/2020 | Park | H01L 27/322 |

* cited by examiner

*Primary Examiner* — Tamara L Weber
(74) *Attorney, Agent, or Firm* — Harness, Dickey & Pierce, P.L.C.

(57) ABSTRACT

A head-up-display (HUD) device is disclosed and includes a plurality of light-emitting diodes (LEDs) configured to emit light beams in response to a control module of a vehicle generating a safety warning. The control module includes a processor that is configured to execute instructions stored in a nontransitory computer-readable memory. The HUD device also includes a first mirror that includes a transparent portion on a first side of the first mirror and a diffusive portion on a second side of the first mirror, and the light beams are configured to pass through the first mirror. The HUD device also comprises a second mirror that is configured to reflect the light beams toward a first reflective surface, and the second mirror is configured to reflect the light beams subsequent to the light beams passing through the first mirror.

15 Claims, 6 Drawing Sheets

FORWARD COLLISION AVOIDANCE DISPLAY

CROSS-REFERENCE TO RELATED APPLICATIONS

This application claims the benefit of U.S. Provisional Application No. 62/727,209, filed on Sep. 5, 2018. The entire disclosure of the above application is incorporated herein by reference.

FIELD

The present disclosure relates to a forward collision avoidance display.

BACKGROUND

This section provides background information related to the present disclosure and is not necessarily prior art.

Vehicles may include forward collision warning systems that alert operators of an impending collision. The alert may be displayed using an instrument cluster of the vehicle and/or a head-up-display (HUD) device of the vehicle. As a specific example, the HUD device may generate an image or indicator that is displayed on a windshield of the vehicle. However, conventional HUD devices may not be capable of producing high-intensity light due to, for example, losses at the windshield and mirrors of the HUD device.

SUMMARY

This section provides a general summary of the disclosure, and this section is not a comprehensive disclosure of its full scope or all of its features.

A head-up-display (HUD) device is disclosed and comprises a plurality of light-emitting diodes (LEDs) configured to emit light beams in response to a control module of a vehicle generating a safety warning, wherein the control module includes a processor that is configured to execute instructions stored in a nontransitory computer-readable memory. The HUD device also comprises a first mirror that includes a transparent portion on a first side of the first mirror and a diffusive portion on a second side of the first mirror, wherein the light beams are configured to pass through the first mirror. The HUD device also comprises a second mirror that is configured to reflect the light beams toward a first reflective surface, wherein the second mirror is configured to reflect the light beams subsequent to the light beams passing through the first mirror.

In some embodiments, the safety warning corresponds to an impending collision between the vehicle and an object.

In some embodiments, the control module generates the safety warning by determining a time-to-collision value based on at least one of (i) image data obtained from a camera, and (ii) sensor data obtained from at least one of a radar system and a LIDAR system.

In some embodiments, the plurality of LEDs includes a tinted casing configured to make the light beams appear as a first color.

In some embodiments, the first mirror is a cold mirror.

In some embodiments, the transparent portion is implemented by one of a glass and a synthetic resin.

In some embodiments, the diffusive portion is implemented by a translucent material.

In some embodiments, the light beams are configured to travel from the diffusive portion to the transparent portion of the cold mirror.

In some embodiments, the second mirror is a concave mirror.

In some embodiments, a first side of the concave mirror is implemented by a reflective material.

In some embodiments, the plurality of LEDs are incorporated on a printed circuit board (PCB).

In some embodiments, the PCB is mounted to a housing of the HUD device.

In some embodiments, the HUD device further comprises a projector that is configured to generate images corresponding to operating characteristics of the vehicle.

In some embodiments, the first reflective surface is a windshield of the vehicle.

Another HUD device is disclosed and comprises a plurality of light-emitting diodes (LEDs) configured to emit light beams in response to a control module of a vehicle generating a safety warning, wherein the control module includes a processor that is configured to execute instructions stored in a nontransitory computer-readable memory. The HUD device also comprises a cold mirror that includes a transparent portion on a first surface of the cold mirror and a diffusive portion on a second surface of the cold mirror, wherein the light beams are configured to pass through the cold mirror. The HUD device also comprises a concave mirror that is configured to reflect the light beams toward a first reflective surface, wherein the concave mirror is configured to reflect the light beams subsequent to the light beams passing through the cold mirror.

In some embodiments, the safety warning corresponds to an impending collision between the vehicle and an object.

In some embodiments, the control module generates the safety warning by determining a time-to-collision value based on at least one of (i) image data obtained from a camera, and (ii) sensor data obtained from at least one of a radar system and a LIDAR system.

In some embodiments, each of the plurality of LEDs includes a tinted casing configured to make the light beams appear as a first color.

In some embodiments, the transparent portion is implemented by one of a glass and a synthetic resin.

In some embodiments, the diffusive portion is implemented by a translucent material.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and the drawings are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
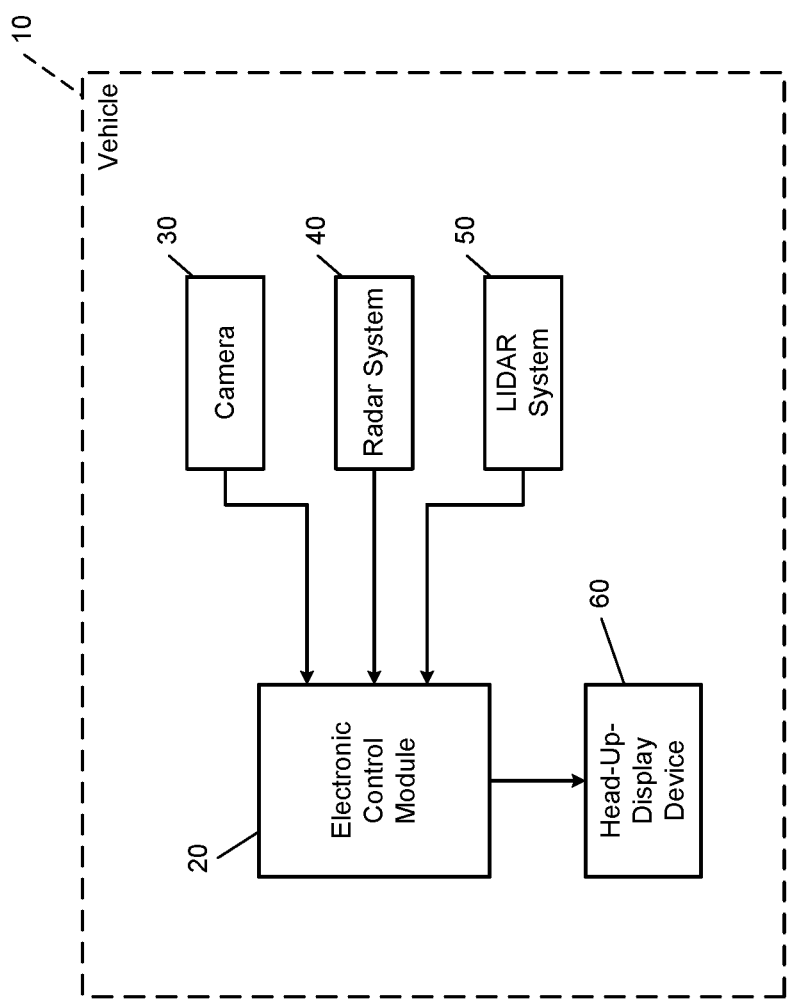
FIG. 1 is an example high-level functional block diagram of a vehicle according to the present disclosure.

With reference to FIG. 1, an example vehicle 10 is shown. The vehicle 10 may include an electronic control module (ECM) 20, a camera 30, a radar system 40, a LIDAR system 50, and a HUD device 60. In order to carry out the functionality described herein, the ECM 20 may be implemented by one or more processors that are configured to execute instructions stored in a nontransitory computer-readable memory, such as a random-access memory (RAM) and/or read-only memory (ROM).

In one embodiment, the ECM 20 is configured to execute a forward collision warning (FCW) algorithm. As an example, the ECM 20 may receive image data from the camera 30 and sensor data from the radar system 40 and/or the LIDAR system 50. If the image data and/or sensor indicate, for example, an object approaching the vehicle 10 or a pedestrian crossing in front of the vehicle 10, the ECM 20 may calculate a time-to-collision of the object or the pedestrian. If the time-to-collision value is less than a threshold value, the ECM 20 may instruct the vehicle 10 to activate a brake of the vehicle 10 in order to decelerate and stop the vehicle 10. Example FCW algorithms are described in further detail in U.S. Pat. No. 9,308,914, filed on Jan. 23, 2015, and assigned to DENSO International America, Inc., and is incorporated herein by reference in its entirety. Additionally, if the time-to-collision value is less than the threshold value, the ECM 20 is configured to instruct the HUD device 60 to generate and display an alert corresponding to the object or pedestrian and/or potential impending collision, as described below in further detail with reference to FIGS. 2-5.

Figure 2:
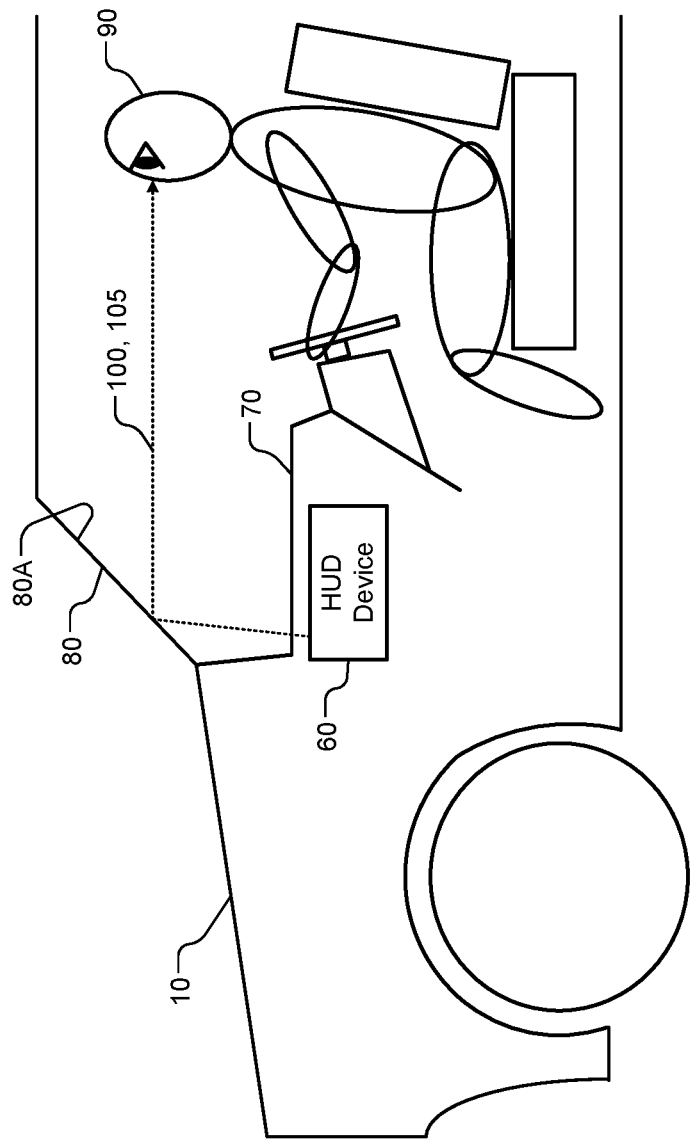
FIG. 2 illustrates an example HUD device of the vehicle according to the present disclosure.

With reference to FIG. 2, an illustration of the HUD device 60 and the vehicle 10 is shown. The HUD device 60 may be located within an instrument panel 70 of the vehicle 10. The HUD device 60 may be configured to project an image on a windshield 80, which may be implemented by a glass, synthetic resin, or other similar transparent material. The projected image is subsequently reflected by an interior surface 80A of the windshield 80, thereby enabling an operator 90 to view a virtual image corresponding to the projected image, as indicated by optical path 100. The virtual image may indicate various types of information, such as a current speed of the vehicle 10, an amount of fuel in the vehicle 10, and other vehicle state information. Additionally, the virtual image may correspond to navigation instructions and/or roadway information.

Likewise, the HUD device 60 may be configured to project the alert corresponding to the object or pedestrian and/or potential impending collision onto the windshield 80. Accordingly, the operator 90 may view the alert that is reflected by the interior surface 80A of the windshield 80 and as indicated by optical path 105.

Figure 3A:
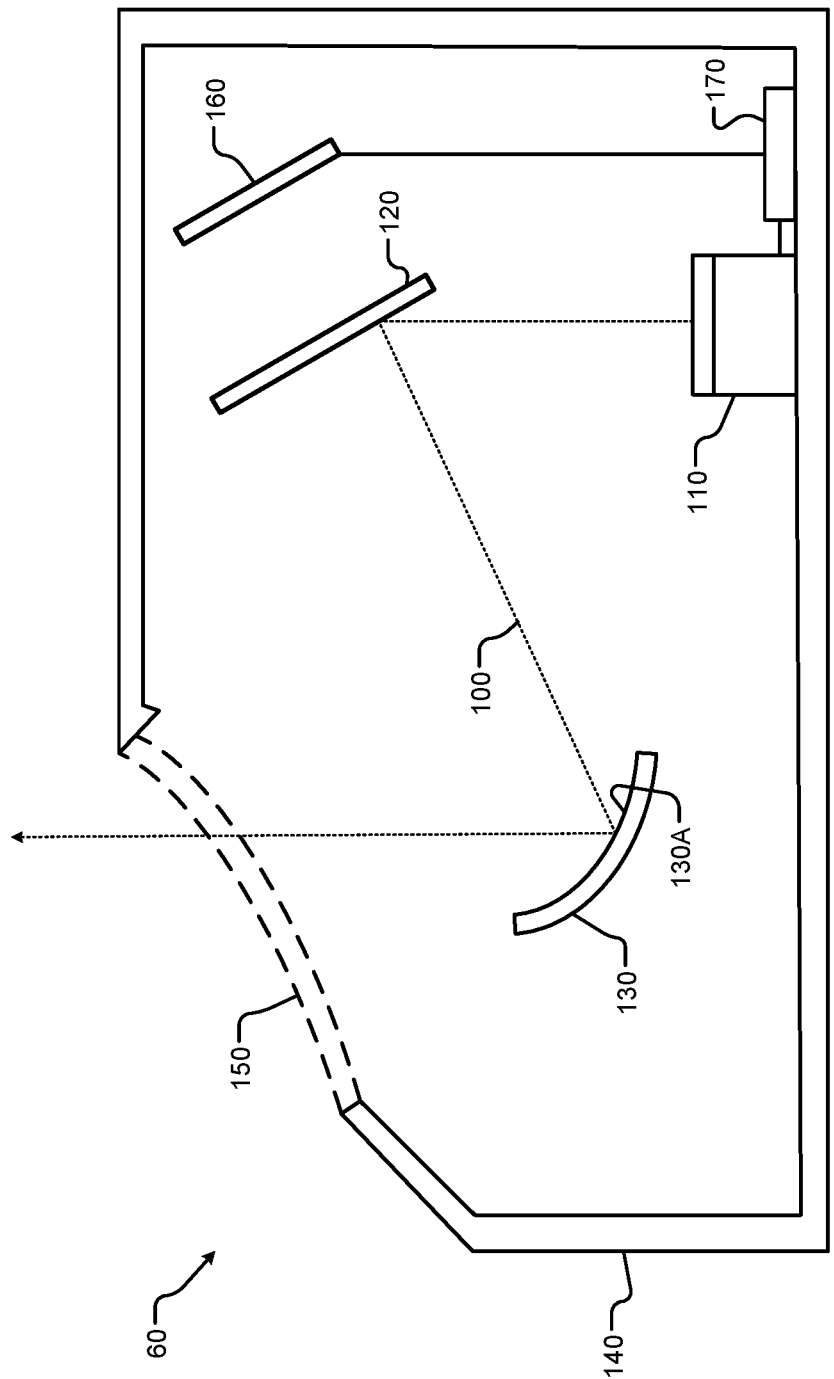
FIGS. 3A-3B illustrate a detailed example HUD device according to the present disclosure.
Figure 3B:
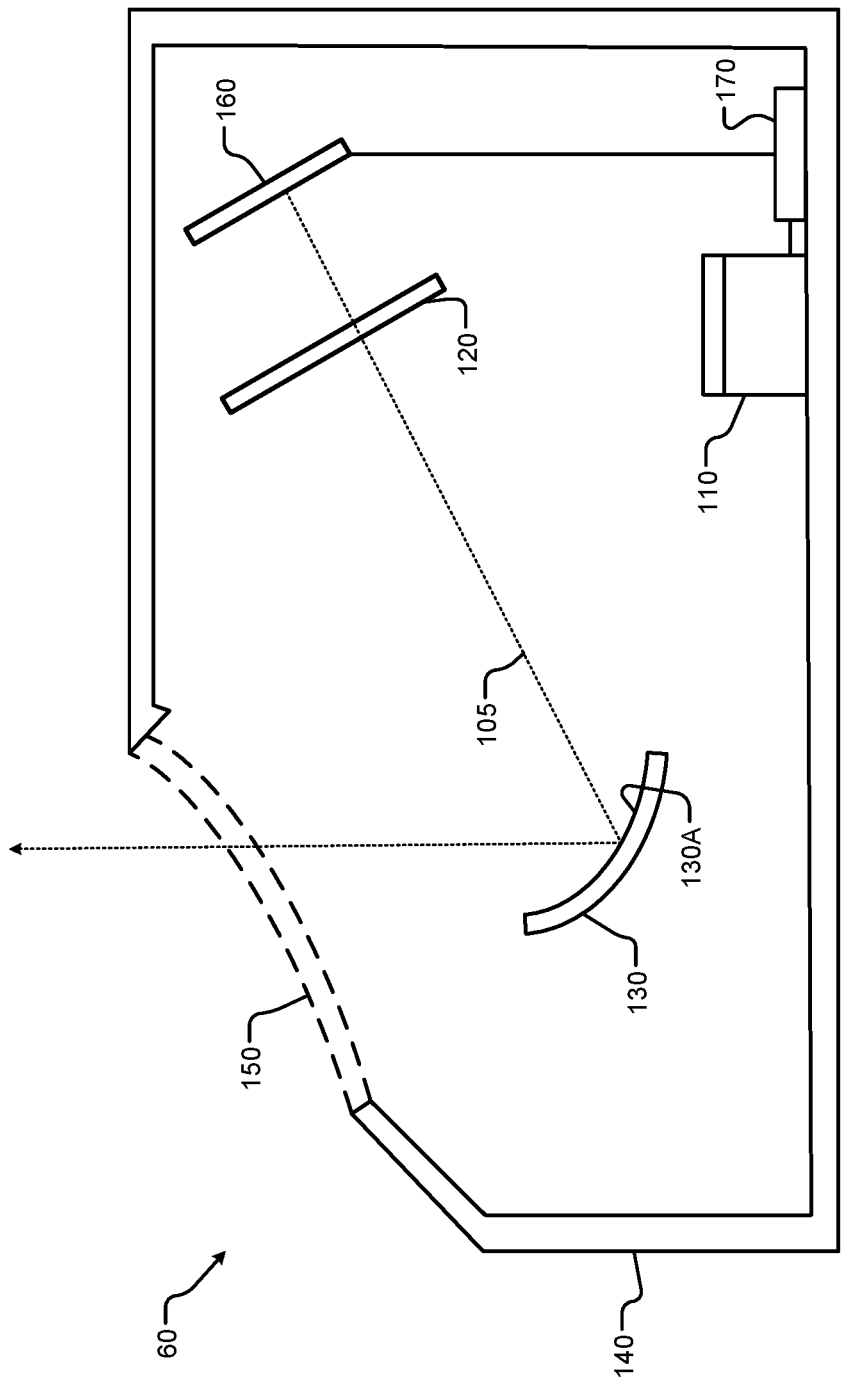

With reference to FIGS. 3A-3B, detailed example illustrations of the HUD device 60 are shown. In one embodiment, the HUD device 60 may include a projector 110, a cold mirror 120, a concave mirror 130, a housing 140, a dust cover 150, a forward collision warning alert device (FCWAD) 160, and a HUD control module 170.

As shown in FIG. 3A, the projector 110 is configured to generate light corresponding to an image and transmit the light toward the cold mirror 120. The projector 110 is described below in further detail with reference to FIG. 4. The cold mirror 120, which is implemented by a transparent material, such as a synthetic resin, glass, or other similar transparent material, is configured to reflect the light corresponding to the image toward the concave mirror 130, as indicated by the optical path 100. Additionally, the cold mirror 120 may be configured to transmit infrared radiation.

The concave mirror 130, which is disposed on the optical path 100, may be implemented by a transparent material and include aluminum on a first surface 130A of the concave mirror 130. Furthermore, the concave mirror 130 is configured to reflect the light corresponding to the image toward the windshield 80 (not shown), as indicated by the optical path 100.

The dust cover 150 may be implemented by a transparent material, such as an acrylic resin. The dust cover 150 is configured to prevent foreign matter from entering the housing 140 and allow light reflected by the concave mirror 130 to contact the windshield 80, thereby enabling the operator 90 to view the virtual image.

Likewise and as shown in FIG. 3B, the FCWAD 160 is configured to emit light in response to, for example, the time-to-collision value being less than the threshold value, as described above. In one embodiment, the HUD control module 170, which may be implemented by a processor that is configured to execute instructions stored in a nontransitory computer-readable medium, such as a RAM and/or ROM, may receive a signal from the ECM 20 (not shown) in response to the time-to-collision value being less than the threshold. In response to receiving the signal, the HUD control module 170 may transmit a signal that activates a light source of the FCWAD 160. The light generated by the FCWAD 160 is diffused by the cold mirror 120 and reflected by the concave mirror 130. Subsequently, the windshield 80 reflects the light generated by the FCWAD 160, thereby enabling the operator to view the light generated by the FCWAD 160, as indicated by the optical path 105. The FCWAD 160 is described below in further detail with reference to FIG. 5.

In other embodiments, the HUD device 60 may include a polarizer plate and a retardation plate disposed above the concave mirror 130. The polarizer plate may be configured to polarize the light transmitted by at least one of the projector 110 and the FCWAD 160. The retardation plate may be configured to shift a phase value of the light transmitted by at least one of the projector 110 and the FCWAD 160. The polarizer plate and the retardation plate are described in further detail in U.S. patent application Ser. No. 15/736,143, filed on Jun. 7, 2016, and assigned to Denso Corporation, and is incorporated herein by reference in its entirety.

Figure 4:
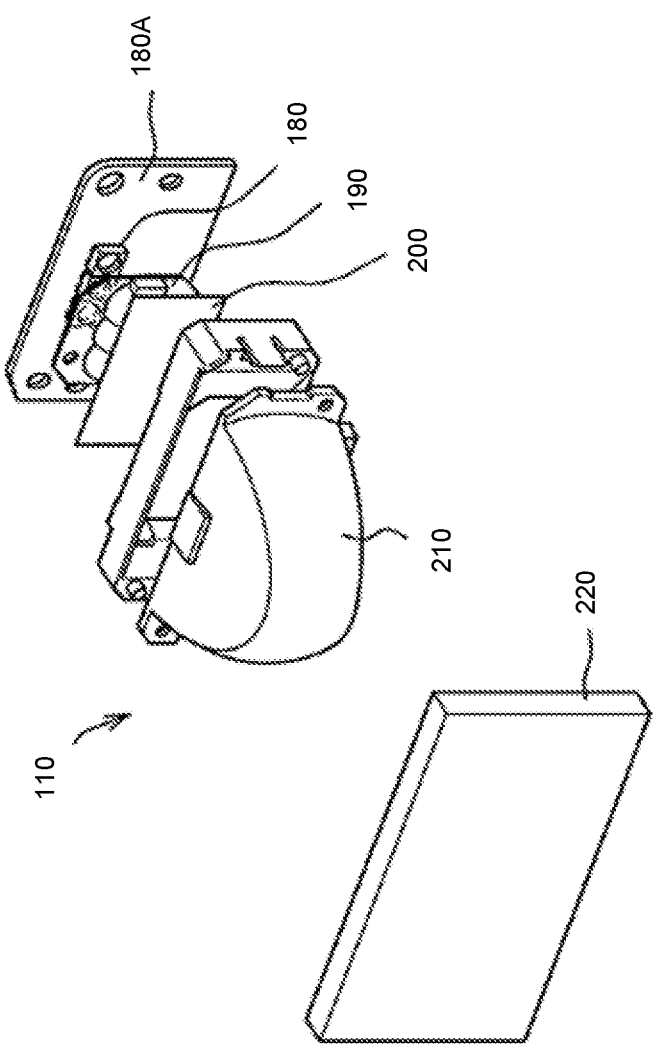
FIG. 4 illustrates a detailed example projector of the HUD device according to the present disclosure.

With reference to FIG. 4, a detailed illustration of the projector 110 is shown. The projector 110 may include a light source 180, a condenser lens 190, a diffusion plate 200, a projection lens 210, and a liquid crystal panel 220. Each component of the projector 110 may be included within a projector case (not shown).

In one embodiment, the light source 180 is implemented by a plurality of light-emitting diodes (LEDs) that are disposed on a printed circuit board (PCB) 180A. The light source 180 may be electrically coupled to a power supply (e.g., a vehicle battery) via the PCB 180A of the projector 110. The light source 180 is configured to project light toward the condenser lens 190. As an example, the light source 180 may be configured to project a pseudo-white light if at least a portion of the plurality of LEDs is covered with a fluorescent material.

The condenser lens 190 is implemented by a transparent material, such as a synthetic resin, glass, or other similar transparent material. Additionally, the condenser lens 190 may be a convex lens that is disposed between the light source 180 and the diffusion plate 200. The condenser lens 190 is configured to condense the light emitted by the light source 180.

The diffusion plate 200 may be implemented by a transparent material. Additionally, the diffusion plate 200 may be disposed between the condenser lens 190 and the projection lens 210. The diffusion plate 200 is configured to adjust a brightness of the light emitted by the light source 180.

The projection lens 210 is implemented by a transparent material. Additionally, the projection lens 210 is disposed between the diffusion plate 200 and the liquid crystal panel 220. The projection lens 210 is configured to condense the light emitted by the light source 180 and project the light toward the liquid crystal panel 220.

The liquid crystal panel 220 may be implemented by, for example, a plurality of thin-film transistors (TFTs) that are configured to control each of the pixels of the liquid crystal panel 220. The liquid crystal panel 220 may also utilize an active matrix addressing scheme to control each of the pixels. The liquid crystal panel 220 may include a pair of polarizing plates with a liquid crystal layer disposed between the pair of polarizing plates. The polarizing plates are configured to pass light polarized in a first direction and reject light polarized in a second, orthogonal direction relative to the first direction. Moreover, by applying a voltage to each pixel, the liquid crystal layer can rotate the polarization direction of the light passing through the polarizing plates and thereby enable the projector 110 to generate an image that is displayed on the windshield 80.

Figure 5:
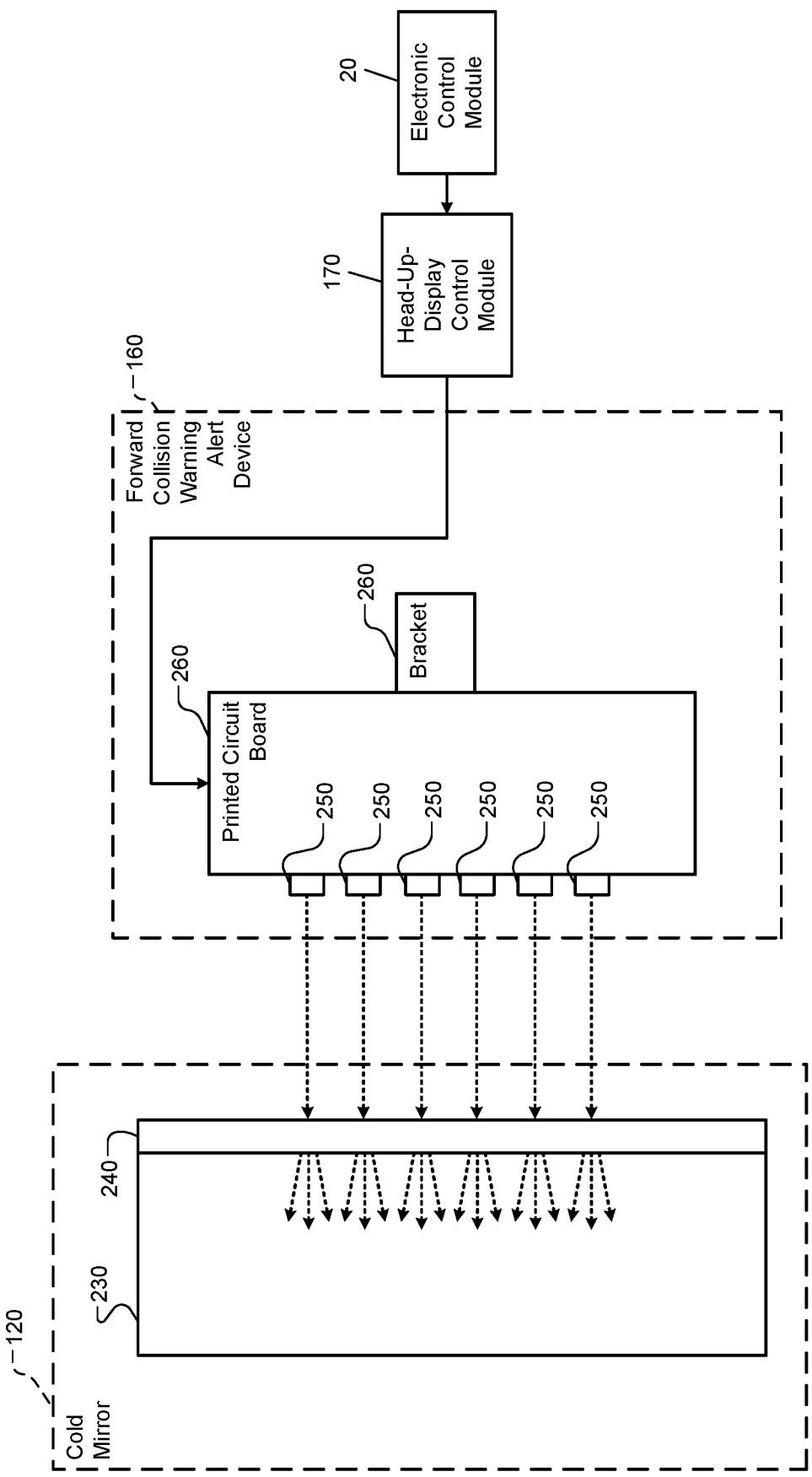
FIG. 5 illustrates an example forward collision alert device of the HUD device according to the present disclosure.

With reference to FIG. 5, a detailed illustration of the FCWAD 160 is shown. In one embodiment, the cold mirror 120 may include a transparent surface 230 located on a first side of the cold mirror 120 and a second surface 240 on a second side of the cold mirror 120. Furthermore, the FCWAD 160 may include a plurality of light-emitting diodes (LEDs) 250 that are disposed on a printed circuit board (PCB) 260 and a bracket 270. The plurality of LEDs 250 may each include a case that is tinted, thereby enabling the LEDs to emit light that appears red, green, yellow, blue, etc. The PCB 260 is mounted to the bracket 270 using any suitable mounting or fastening elements (e.g., a screw), and the bracket 270 may be mounted at any location within the housing 140 using any suitable mounting or fastening elements.

In response to receiving the signal from the ECM 20, the HUD control module 170 may transmit a signal that causes the plurality of LEDs 250 to emit light, as indicated by the dashed arrows extending from the plurality of LEDs 250. The second surface 240 is configured to diffuse the light emitted from the plurality of LEDs 250, as indicated by the dashed arrows extending from the second surface 240. In one embodiment, the second surface 240 may be implemented by any material that is configured to diffuse light, such as a translucent material (e.g., ground glass, polytetrafluoroethylene, holographs, opal glass, greyed glass, etc.). Alternatively, the second surface 240 may be formed by abrasively blasting (e.g., sandblasting) the second side of the cold mirror 120. In other embodiments, the second surface 240 may be implemented by a frost coating or other similar elements.

The diffused light passes through the transparent surface 230 and is then reflected by the concave mirror 130, as described above. Subsequently, the windshield 80 is configured to reflect the diffused light, thereby enabling the operator to view the diffused light. A uniformity and intensity of the diffused light may be based on a distance between the plurality of LEDs 250 and the cold mirror 120.

In other words, the FCWAD 160 is configured to provide an evenly distributed amount of high-intensity light (i.e., the alert) corresponding to the detected object or pedestrian and/or potential impending collision in response to the ECM 20 determining the time-to-collision is less than the threshold value. The evenly distributed amount of high-intensity light may correspond to any amount of evenness. Furthermore, the high-intensity light (e.g., a light that appears red) reflected by the concave mirror 130 and the windshield 80 is configured to sufficiently notify the operator 90 of the object or pedestrian and/or potential impending collision, thereby sufficiently alerting the operator 90 to execute corrective actions that mitigate the danger (e.g., depressing a brake pedal).

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A head-up-display (HUD) device comprising:
  a cold mirror that includes a transparent portion on a first side of the cold mirror and a diffusive portion on a second side of the cold mirror;
  a concave mirror;
  a forward collision warning alert device having a plurality of light-emitting diodes (LEDs) configured to emit light beams in response to a control module of a vehicle generating a safety warning, wherein the control module includes a processor that is configured to execute instructions stored in a nontransitory computer-readable memory, the light beams pass through the cold mirror towards the concave mirror by passing through the transparent portion on the first side of the cold mirror and then the diffusive portion on the second side of the cold mirror, and the diffusive portion diffuses the light beams; and
  a projector configured to generate images corresponding to operating characteristics of the vehicle and transmit the images towards the cold mirror to reflect off of the cold mirror towards the concave mirror;
  wherein the concave a mirror is configured to reflect the diffused light beams toward a windshield of the vehicle first subsequent to the diffused light beams passing through the cold mirror and to reflect the images toward the windshield of the vehicle subsequent to the images reflecting off of the cold mirror.

2. The HUD device of claim 1, wherein the safety warning corresponds to an impending collision between the vehicle and an object.

3. The HUD device of claim 2, wherein the control module generates the safety warning by determining a time-to-collision value based on at least one of (i) image data obtained from a camera, and (ii) sensor data obtained from at least one of a radar system and a LIDAR system.

4. The HUD device of claim 1, wherein each of the plurality of LEDs includes a tinted casing configured to make the light beams appear as a first color.

5. The HUD device of claim 1, wherein the transparent portion is implemented by one of a glass and a synthetic resin.

6. The HUD device of claim 1, wherein the diffusive portion is implemented by a translucent material.

7. The HUD device of claim 1, wherein a first side of the concave mirror is implemented by a reflective material.

8. The HUD device of claim 1, wherein the plurality of LEDs are incorporated on a printed circuit board (PCB).

9. The HUD device of claim 8, wherein the PCB is mounted to a housing of the HUD device.

10. A head-up-display (HUD) device comprising:
a concave mirror;
a forward collision warning alert device having a plurality of light-emitting diodes (LEDs) configured to emit light beams in response to a control module of a vehicle generating a safety warning, wherein the control module includes a processor that is configured to execute instructions stored in a nontransitory computer-readable memory;
a cold mirror that includes a transparent portion on a first side of the cold mirror and a diffusive portion on a second side of the cold mirror, wherein the light beams pass through the cold mirror towards the concave mirror by passing through the transparent portion on the first side of the cold mirror and then the diffusive portion on the second side of the cold mirror, and the diffusive portion diffuses the light beams; and
a projector configured to generate images corresponding to operating characteristics of the vehicle and transmit the images towards the cold mirror to reflect off of the cold mirror towards the concave mirror
wherein the concave mirror is configured to reflect the light beams toward a windshield of the vehicle subsequent to the diffused light beams passing through the cold mirror and to reflect the images toward the windshield of the vehicle subsequent to the images reflecting off of the cold mirror.

11. The HUD device of claim 10, wherein the safety warning corresponds to an impending collision between the vehicle and an object.

12. The HUD device of claim 11, wherein the control module generates the safety warning by determining a time-to-collision value based on at least one of (i) image data obtained from a camera, and (ii) sensor data obtained from at least one of a radar system and a LIDAR system.

13. The HUD device of claim 10, wherein each of the plurality of LEDs includes a tinted casing configured to make the light beams appear as a first color.

14. The HUD device of claim 10, wherein the transparent portion is implemented by one of a glass and a synthetic resin.

15. The HUD device of claim 10, wherein the diffusive portion is implemented by a translucent material.

* * * * *